N. M. BOYNTON, J. P. MICHIELI & T. A. BRANDHOFER, Jr.
AUTOMATIC LINE COUPLING.
APPLICATION FILED JUNE 25, 1913.
1,094,115.
Patented Apr. 21, 1914.
2 SHEETS—SHEET 1.
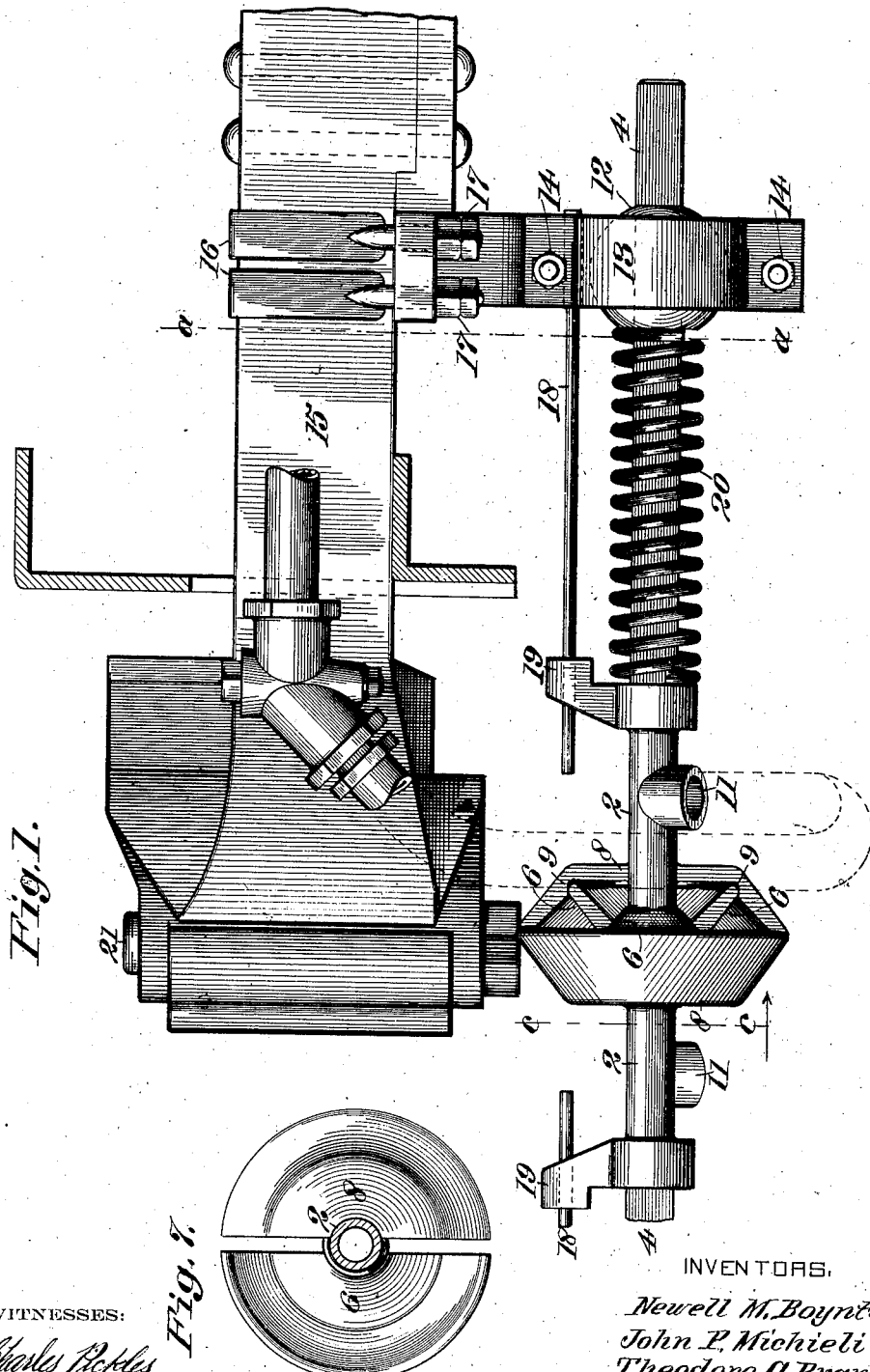
WITNESSES:
Charles Pickles
R. L. Berry
INVENTORS.
Newell M. Boynton,
John P. Michieli,
Theodore A. Brandhofer, Jr.
BY J. H. Strong
ATTORNEY N. M. BOYNTON, J. P. MICHIELI & T. A. BRANDHOFER, Jr.
AUTOMATIC LINE COUPLING.
APPLICATION FILED JUNE 25, 1913.
1,094,115.
Patented Apr. 21, 1914.
2 SHEETS—SHEET 2.
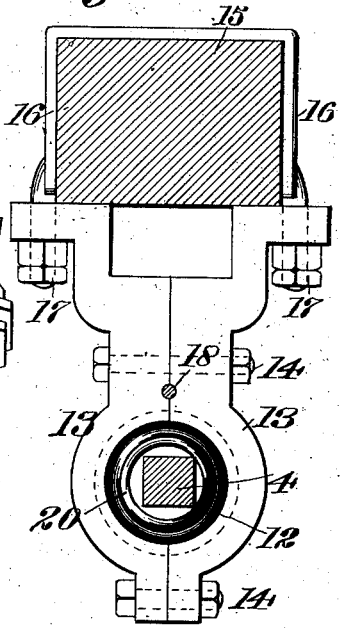
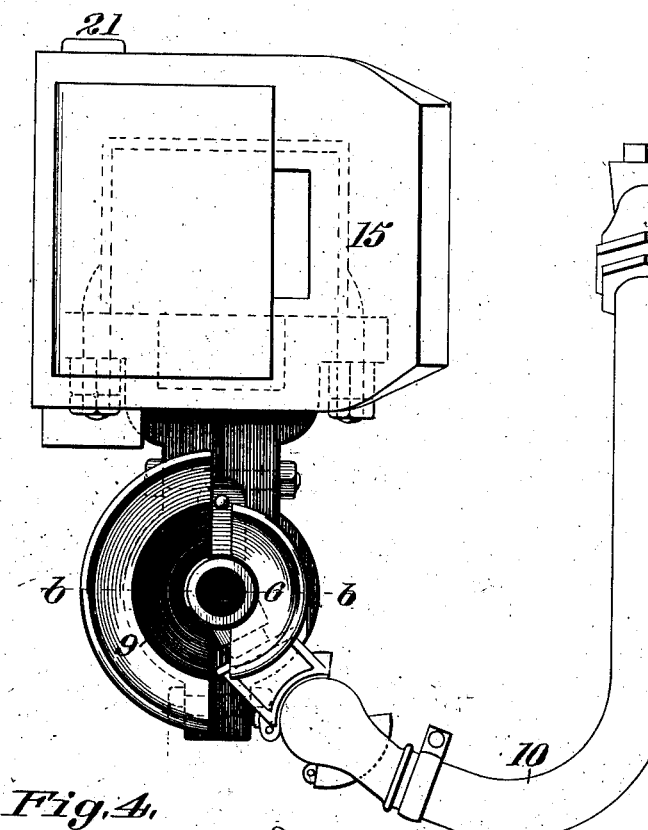
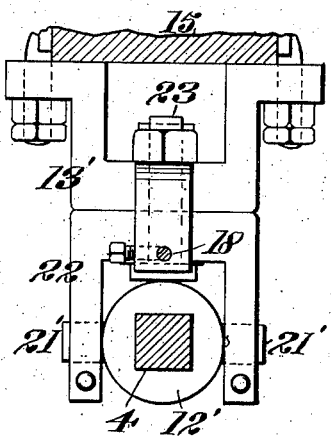
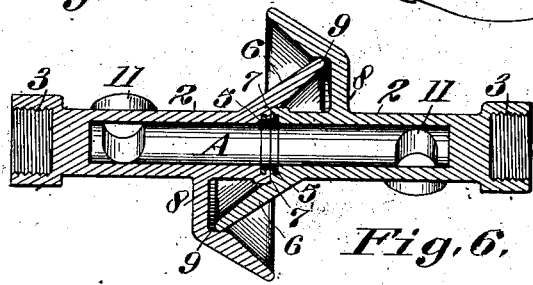
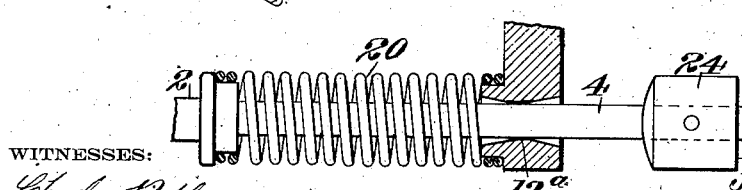
WITNESSES:
INVENTORS
Newell M. Boynton,
John P. Michieli,
Theodore A. Brandhofer Jr.
BY J. H. Strong
ATTORNEY

UNITED STATES PATENT OFFICE.

NEWELL M. BOYNTON, JOHN P. MICHIELI, AND THEODORE A. BRANDHOFER, JR., OF SAN FRANCISCO, CALIFORNIA.

AUTOMATIC LINE-COUPLING.

1,094,115.      Specification of Letters Patent.     Patented Apr. 21, 1914.

Application filed June 25, 1913. Serial No. 775,671.

*To all whom it may concern:*

Be it known that we, NEWELL M. BOYNTON, JOHN P. MICHIELI, and THEODORE A. BRANDHOFER, Jr., citizens of the United States, residing in the city and county of San Francisco and State of California, have invented new and useful Improvements in Automatic Line-Couplings, of which the following is a specification.

This invention relates to a line coupling for trains.

It is the object of this invention to provide a coupling for air, steam or electric lines of trains which is automatic in coupling and uncoupling, and adapted to interlock with a corresponding coupling without the use of loose or separate connecting parts.

Another object is to provide a coupling of the above character which is simple in construction, efficient in operation, not liable to get out of order, and adapted to be applied to most railroad cars without necessitating alteration of the construction of the latter.

A further object is to provide a line coupling which is self-centering and alining, and so constructed as to readily adjust itself to variations in the position of a complementary coupling on an adjoining car with which it is intended to interlock.

Another object is to provide a line coupling of few parts which are cheap of manufacture and readily applied, and which can be easily removed when necessary for repairs.

Other objects will appear hereinafter.

The invention primarily resides in a coupling head formed with a pair of off-set, semi-circular deflecting or guide flanges, having inclined inner faces converging into centering pockets, said guide flanges being adapted to extend into the centering pockets on a complementary coupling head, a longitudinally movable support for said head, yieldable means for normally maintaining said head and support at a forwardmost position, said support mounted to have an oscillatory movement in conjunction with its longitudinal movement, and means for maintaining the head supporting means in a central position.

The invention further consists in the parts and the construction and combination of parts as hereinafter more fully described and claimed, having reference to the accompanying drawings, in which,—

Figure 1 is a side view of the invention as applied. Fig. 2 is a front elevation of same. Fig. 3 is a detail vertical section on the line *a—a* of Fig. 1. Fig. 4 is a detail horizontal section on the line *b—b* of Fig. 2. Figs. 5 and 6 are modified forms of the mounting of the coupling. Fig. 7 is a section in elevation on the line *c—c* of Fig. 1.

In the drawings the coupling is shown as consisting of a stem 2, one end of which is threaded at 3 and screwed upon the outer end of a supporting bar 4. The stem 2 is formed with a longitudinal passage A which opens at the outer end of the stem 2. A gasket 5 is mounted on the end of the stem 2 and surrounds the mouth of the passage A. The outer face of the gasket normally projects a short distance beyond the end of the stem 2 and is designed to abut against a corresponding gasket on a complementary coupling head, as shown in Fig. 4, to form a tight joint between the communicating passages A, as will be later described.

Formed on the outer end of the stem 2 is a divergent flange 6, which extends approximately half way around the stem 2, with its ends terminating on a vertical plane to one side of the vertical diameter of the stem 2. The outer, peripheral edge of the flange 6 is formed on an arc of a circle concentric with the longitudinal axis of the stem 2; the inner face of the flange 6 converging toward the stem 2 and terminating in a semi-circular, off-set portion 7, corresponding to the exterior periphery of the end of the stem 2, and which off-set portion is designed to receive the end of the stem of the complementary coupling head.

Formed on the stem 2, a short distance rearward of the flange 6 and on the side of the stem 2, opposite the flange 6, is a semiannular, radial flange 8, the outer edge of which turns toward the outer end of the stem 2 and is tapered on its inner face to form an incline which converges toward the stem 2 and terminates in an off-set portion or pocket 9, having an arcuate side wall corresponding to the curved outer periphery of the flange 6, and which recess or pocket is adapted to receive the end of the flange 6 on a complementary coupling head, as shown in Fig. 4. The outer edge of the flange 8 is formed on an arc concentric with the outer edge of the flange 6, and its ends terminate vertically parallel with the ends of the flange 6 and spaced therefrom. The passage A in the tubular stem 2 is adapted to be connected to the free end of a flexible hose 10, through an opening 11, in any suitable manner.

The supporting bar 4 is preferably rectangular in cross-section, and is designed to be mounted to have a combined oscillatory and longitudinal reciprocal movement. In the form of the invention shown in Fig. 1, the bar 4 is shown as extending through and slidably mounted in a ball 12, loosely supported in a socket bearing formed by a pair of hangers 13, clamped together on opposite sides of the ball 12, by means of bolts 14. The hangers 13 are designed to be mounted on a draw-bar 15 on a car, and to extend therebeneath, as shown in Figs. 1 and 3; the hangers 13 being held in place on the draw-bar 15 by means of saddle irons 16, which are placed astride of the draw-bar 15 and have threaded ends which extend through base flanges on the hangers 13, and are connected to the latter by means of nuts 17. The bar 4 extends parallel with the longitudinal center of the draw-bar 15 and is normally maintained horizontally in this position by means of a centering spring 18. One end of the spring 18 is rigidly secured to the hangers 13, while its other end passes through and is slidable in a projection 19, formed on the stem 2, as shown in Fig. 1. The centering spring 18 is of sufficient tension to normally maintain the bar 4 in a horizontal position and at the same time permit of its being oscillated in any direction on its ball support 12.

Wound on the bar 4, and interposed between the ball 12 and the inner end of the stem 2, is a compression spring 20, which is tensioned to normally maintain the bar 4 in its outermost or advanced position, in which position the outer face of the stem 2 will project a short distance beyond the vertical center of a coupling pin 21 on the head of the draw-bar 15; the longitudinal axis of the coupler head being disposed in vertical alinement with the center of the coupling pin 21.

In the operation of the form of the invention just described and shown in Figs. 1—2—3 and 4, when two cars carrying corresponding couplers are brought together, end to end, and connected by the coupling pin 21 in the usual manner, the flanges 6 on the opposed coupling heads will be directed into the pockets 9 so that the gaskets 5 on the ends of the stems 2 will abut against each other. The two coupling heads in coming together will, by reason of the bases of the heads being positioned in advance of the coupling pin 21, cause the supporting bars 4 to move lengthwise in opposition to the compression springs 20, which springs will then operate to maintain the complementary coupling heads in close contact with each other under considerable pressure, thus forming a tight joint between the gaskets 5 and permitting the flow of steam or air through the connecting passages A. In event of the coupling heads being out of alinement with each other on moving two cars into their coupling position, which might be occasioned by the cars being on a curved track or uneven grade, the flanges 6 will be engaged by the inner faces of the flanges 8 and be directed thereby into the pockets 9, thereby centralizing and alining the coupling heads in relation to each other; the coupling heads being free to move in any direction by reason of the flexible character of the centering spring 18.

In Fig. 5 the bar 4 is shown as slidably supported in a block 12', having trunnions 21' on diametrically opposite sides extending into and turnable in bearings on a yoke 22, which is supported and turnable on a pivot pin 23, carried by a hanger 13'. The yoke 22 being mounted to swing horizontally and the block 12' to swing vertically, the bar 4 will be permitted to have a vertical and horizontal movement on its support.

In Fig. 6 the bar 4 is shown as mounted to rock on a fulcrum bearing $12^a$, being free to move horizontally, vertically and longitudinally in the latter. The bar 4 in this case is normally maintained in a horizontal position by the coöperation of a counterweight 24, mounted on the end of the bar 4, and a combined compression and torsion spring 20' which is wound around the bar 4, and has its ends secured to the bearing $12^a$ and to the end of the stem 2. In the latter form of mounting the bar 4 the use of a separate centering spring 18 may be dispensed with.

It is manifest that while the coupler head is shown as provided with a single passage A for the passage of steam or air, the number of passages may be increased to any desired extent, and it is also obvious that the coupler head may be fitted with electrical contact members where it is desired to couple the terminals of electrical conductors. It is also manifest that while the coupler is shown as carried by the draw-bar of a car, it may be mounted in any other convenient manner; this form of mounting, however, being more desirable on account of the greater facility in centering the coupler on various cars and adapting the coupling member on one car to register with the coupling member on another car.

If desired, the line connections to the coupler may be made in any manner other than through the hose coupling 10; the latter arrangement being provided so as not to necessitate alteration of the usual well-known piping systems now generally in use; the construction here shown enabling the attachment of the coupler to most cars without any changes in construction of the car fittings.

Having thus described our invention, what we claim and desire to secure by Letters Patent, is:

1. An automatic coupling and uncoupling for trains, comprising a head formed with a passage communicating with the conducting line on the car, a semi-annular divergent flange on the end of said head, a second divergent semi-annular flange on said head rearward of the before-mentioned flange and on the opposite side of said head, said last-named flange formed with a pocket adapted to receive the forward flange of a complementary head, and a yieldable support for said head.

2. An automatic coupling and uncoupling, for trains, comprising a head formed with a passage communicating with the conducting line on the car, a divergent semi-annular flange on the end of said head, a second divergent semi-annular flange on said head rearward of the before-mentioned flange and on the opposite side of said head, said last-named flange formed with a pocket adapted to receive the forward flange of a complementary head, a slidable support for said head, and resilient means for maintaining said support in an advanced position.

3. An automatic coupling and uncoupling for trains, comprising a head formed with a passage adapted to be connected with the conducting line on the car, a semi-annular flange on said head rearward of the before-mentioned flange and on the opposite side of said head, said last-named flange formed with a pocket adapted to receive the forward flange of a complementary head, a slidable support for said head, resilient means for maintaining said support in an advanced position, said head supporting means mounted to have an oscillatory movement, and spring means for maintaining the support in a central position.

4. In a line coupling, a coupling member formed with off-set, divergent, semi-annular flanges adapted to receive corresponding flanges on a complementary coupling head, a horizontal bar mounted to have vertical, transverse and longitudinal movement, spring means for maintaining said bar in an advanced position, and yieldable means for normally maintaining the bar in a horizontal position.

5. A coupler head for train lines, comprising a body formed with a passage adapted to be connected with a train line terminal, a semi-annular flange on the end of said member formed with an inclined inner face, an arcuate shoulder at the base of said flange adapted to receive the end of a complementary coupling head, and a second semi-annular flange on said member on the side opposite the before-mentioned flange and rearward thereof, said last-named flange formed with an inclined face terminating in a pocket adapted to receive the outermost flange on a complementary coupling head.

In testimony whereof we have hereunto set our hands in the presence of two subscribing witnesses.

NEWELL M. BOYNTON.
    JOHN P. MICHIELI.
    THEODORE A. BRANDHOFER, Jr.

Witnesses:
    JOHN H. HERRING,
    W. W. HEALEY.